United States Patent [19]

Han

[11] Patent Number: 5,463,714

[45] Date of Patent: Oct. 31, 1995

[54] SOUND DATA INTERPOLATING CIRCUIT

[75] Inventor: Hong-Su Han, Suwon, Rep. of Korea

[73] Assignee: Samsung Electronics Co., Ltd., Kyungki-do, Rep. of Korea

[21] Appl. No.: 45,130

[22] Filed: Apr. 12, 1993

[30] Foreign Application Priority Data

Apr. 11, 1992 [KR] Rep. of Korea .................. 92-6045

[51] Int. Cl.$^6$ ...................................... G10L 9/00
[52] U.S. Cl. ..................... 395/2.74; 395/2.35; 395/2.37; 371/38.1; 371/39.1
[58] Field of Search ................ 395/2, 2.1, 2.21, 395/2.35–2.37, 2.67, 2.74; 381/46; 371/31, 38.1, 39.1

[56] References Cited

U.S. PATENT DOCUMENTS

| | | | |
|---|---|---|---|
| 4,206,440 | 6/1980 | Doi et al. | 371/38.1 |
| 4,380,071 | 4/1983 | Odaka | 371/39.1 |
| 4,425,644 | 1/1984 | Scholz | 371/39.1 |
| 4,451,921 | 5/1984 | Odaka | 371/31 |
| 4,491,943 | 1/1985 | Iga et al. | 371/39.1 |
| 4,497,055 | 1/1985 | Hoshino et al. | 371/31 |
| 4,639,920 | 1/1987 | Kaneko | 371/31 |
| 4,688,224 | 8/1987 | Dal Degan et al. | 381/46 |
| 4,763,293 | 8/1988 | Takei et al. | 371/31 |
| 4,907,277 | 3/1990 | Callens et al. | 395/2.37 |

*Primary Examiner*—Allen R. MacDonald
*Assistant Examiner*—Michael A. Sartori
*Attorney, Agent, or Firm*—Sughrue, Mion, Zinn, Macpeak & Seas

[57] ABSTRACT

A sound data interpolating circuit includes data converting means for converting inputted serial sound data to parallel sound data to thereby output the same; pulse generating means for generating interpolating pulses, channel gating pulses and loading pulses according to a double error signal outputted from a BCH error correction circuit and a clock signals generated from clock generating means; data extracting means for maintaining prior data during a double error occurrence and outputting data interpolated using the prior and following non-erroneous data in accordance with the interpolating pulses inputted from the pulses and clock signals generated from the clock generating means; data selecting means for outputting data outputted from the data extracting means according to a sound channel; and average value calculating means for striking an average from the data outputted from the data converting means and data selecting means to thereafter output the average value. The sound data interpolating circuit improves tone quality by performing an average value interpolation using the prior and following non-erroneous samples per respective sound channels in the case of an individual double error, and by performing pre-interpolation in the case of continuous double error occurrence, in a state where correction is impossible by way of BCH error correction during occurrence of sample errors in aural PCM data.

8 Claims, 15 Drawing Sheets

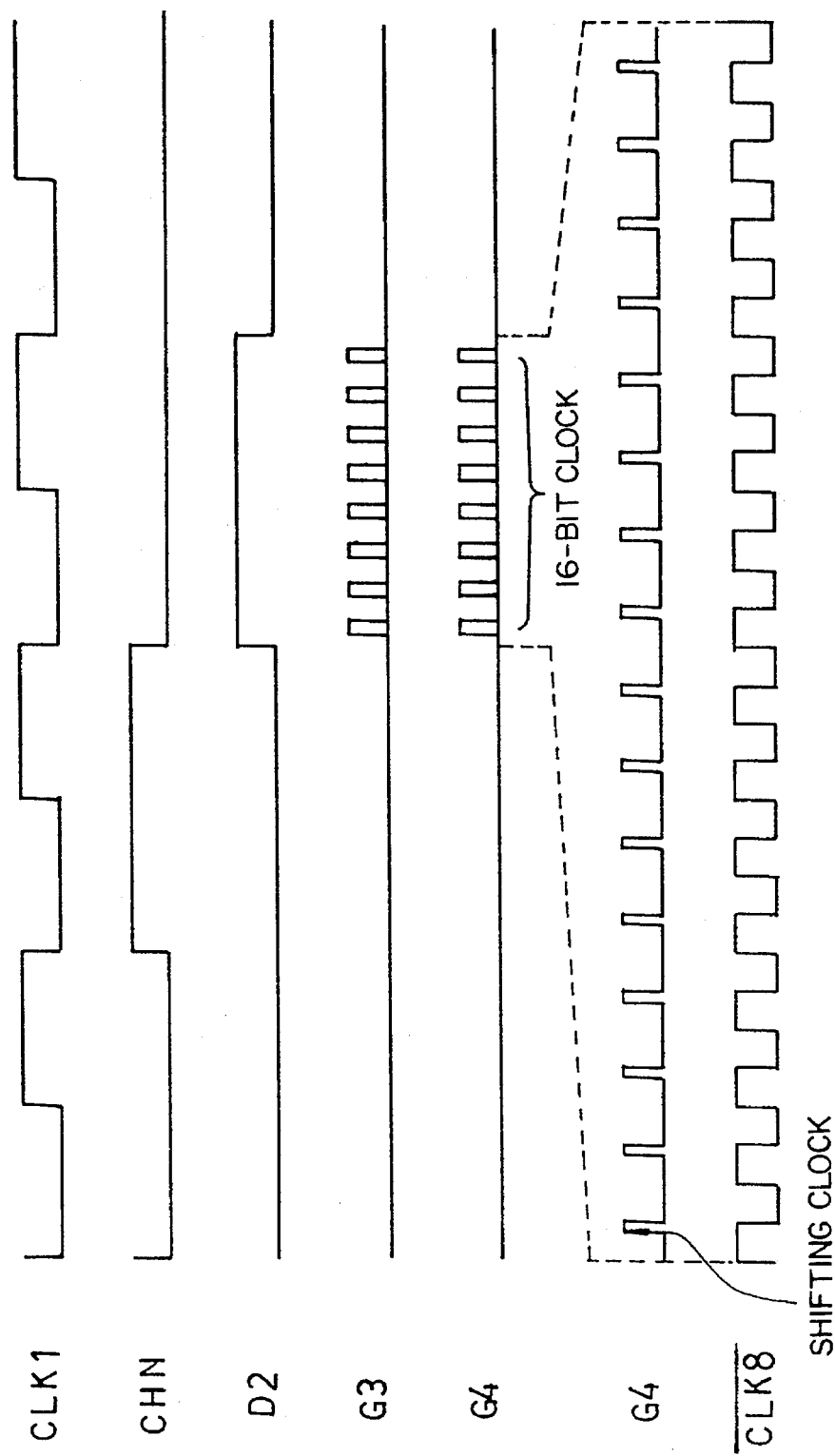

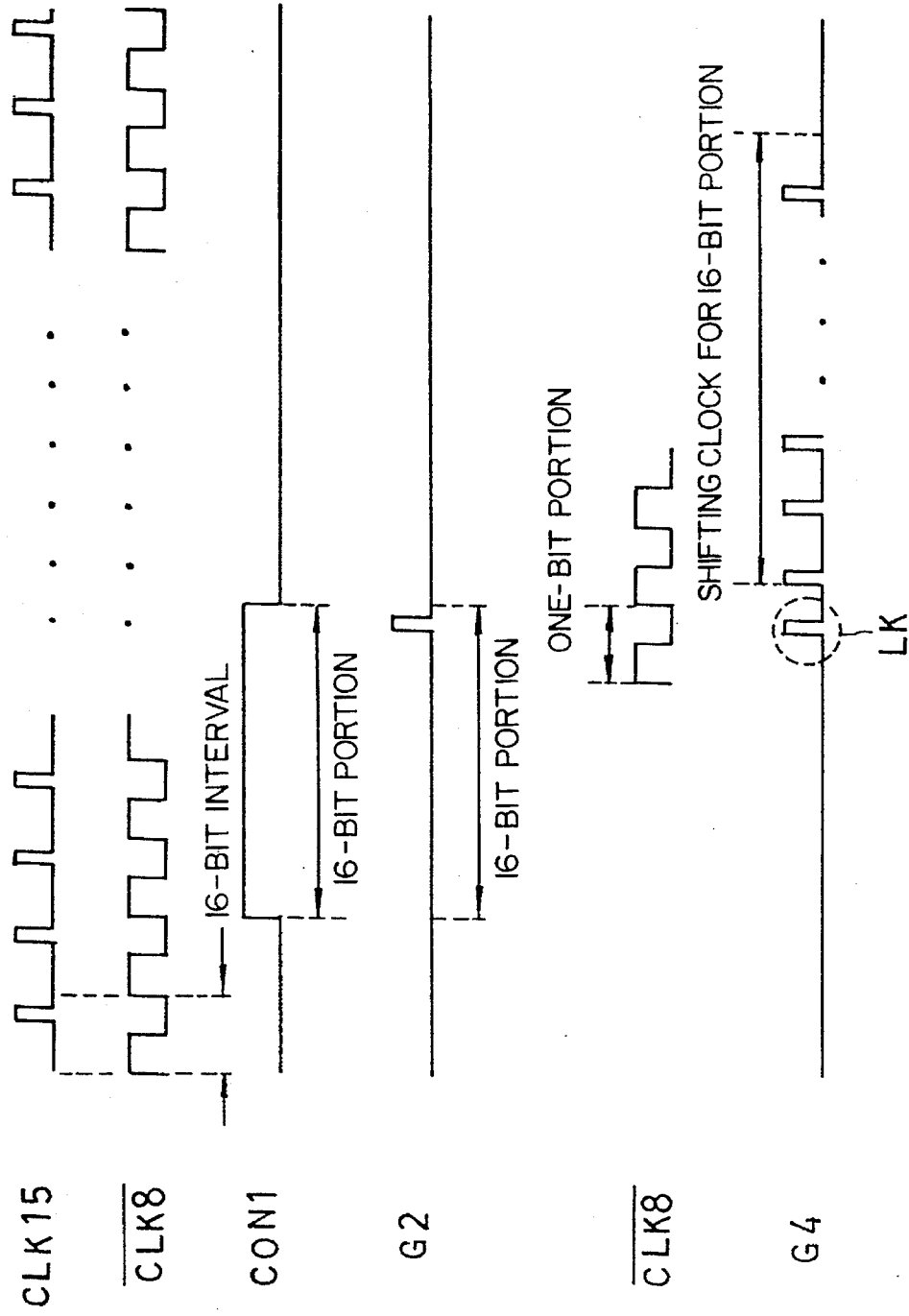

5,463,714

SOUND DATA INTERPOLATING CIRCUIT

BACKGROUND OF THE INVENTION

1. Field of the Invention

The present invention relates to a sound data processing system, and more particularly to a sound data interpolating circuit which, when an occurrence of a sample error in a sound Pulse-Code Modulation (PCM) data cannot be corrected by an error correction circuit, can, in an individual double error, perform an average value interpolation against prior and subsequent samples for every sound channel, and can, in a continuous double error, perform a preinterpolation, to thereafter improve tone quality.

2. Description of the Prior Art

In order to reproduce sound PCM data in an original aural signal, a decoding is performed, and then error correction and compensation are performed to thereby detect whether or not there is an error.

Conventionally a Bose-Chaudhuri-Hocquenghem (BCH) error correction circuit performing error correction per 64-bit sample has been utilized. The 64-bits are comprised of an information bit block of 56-bits, an error correction bit block of 7-bits and redundancy bit of 1-bit, and when an error occurs in the information bit block, the error is corrected by an error correction bit.

However, though the BCH error correction circuit can correct an error of one bit per sample generated in a transmission process, a correction of a double error covering more than 2 bits per sample cannot be performed by the BCH error correction circuit, which instead outputs a double error signal. Data wherein the error correction cannot be performed by the BCH error correction circuit is evidenced as noise.

For example, in U.S. Pat. No. 4,451,921, entitled "PCM Signal Processing Circuit" clock noise is produced by discontinuities of PCM signal data in a wrinkled area of the like of a magnetic tape, and interpolation to data situated prior to and after the PCM signal data is performed to thereby prevent the generation of clock noise within an audio signal. Though this system can prevent noise regeneration in the cases of special variable speed regeneration or editing or the like within the audio signal, the correction of double errors has not been performed.

As seen from the foregoing, the signals which have not undergone error correction are outputted as noise to thereby degrade audio reproduction.

SUMMARY OF THE INVENTION

Accordingly, it is an object of the present invention to provide a sound data interpolating circuit which can improve the tone quality of a reproduced sound signal even during a double error occurrence in received sound data.

In accordance with the object of the present invention, there is provided a sound data interpolating circuit, comprising: data converting means for converting inputted serial sound data to parallel sound data to thereby output the same; pulse generating means for generating interpolating pulses, channel gating pulses and loading pulses according to the double error signal outputted from a BCH error correction circuit and a clock signal generated from a clock generating means; a data extracting means for maintaining prior data during a double error occurrence or outputting data interpolated from prior or later data in accordance with the interpolating pulses inputted from the pulse generating means, channel gating pulses, loading pulses and clock signal generated from the clock generating means; a data selecting means for outputting data outputted from the data extracting means according to a sound channel; and an average value calculating means for striking an average from the data outputted from the data converting means and data selecting means to thereafter output the average value to the data extracting means.

BRIEF DESCRIPTION OF THE DRAWINGS

For fuller understanding of the nature of objects of the invention, reference should be made to the following detailed description taken in conjunction with the accompanying drawings in which:

FIG. 13A is a timing diagram of FIG. 5 in a normal condition;

FIG. 13B is a timing diagram of FIG. 5 during an individual double error occurrence.

DETAILED DESCRIPTION OF THE INVENTION

Hereinafter, preferred embodiments of the present invention will be described in detail with reference to the accompanying drawings.

Figure 1A:
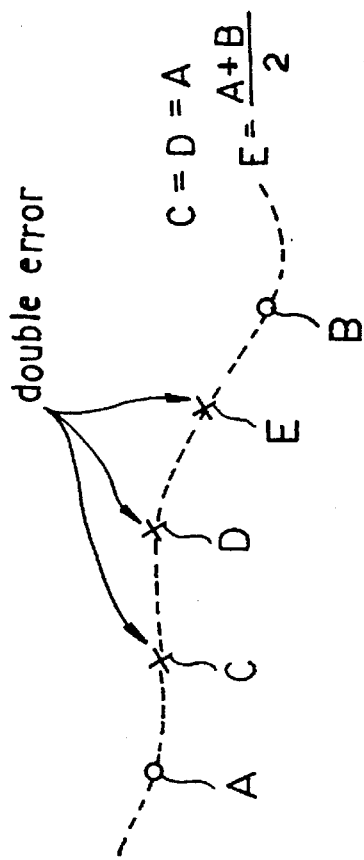
FIG. 1 is a drawing showing the principle of sound data interpolation in accordance with the present invention.
Figure 1B:
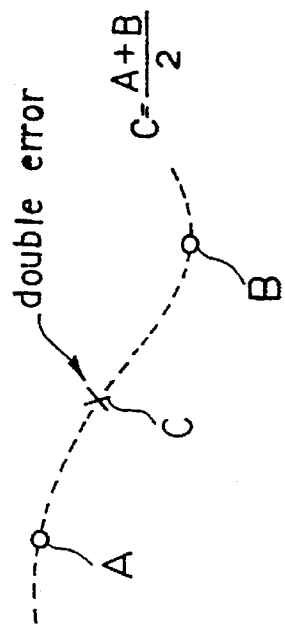

FIG. 1A shows the principle of sound data interpolation during an individual double error occurrence according to the present invention. FIG. 1B shows the principle of sound data interpolation according to the present invention during a continuous double error occurrence (more than two events).

As described in FIG. 1A, in the case of an individual double error, the non-erroneous sample data existing prior to and after the erroneous sampled data are combined or put together to thereby produce an average value.

In the case of a continuous double error as illustrated in

FIG. 1B, the non-erroneous sample data existing prior to occurrence of the error is maintained, and in the case of the last double error, the non-erroneous sample data existing prior to and following the last erroneous data are combined together to thereby get an average value.

In the descriptions that follow, the former case will be called "average value interpolation" and the latter will be called "pre-interpolation".

In the sound data interpolating circuit according to the present invention, the aforementioned average value interpolation and pre-interpolation will be executed in the same circuit without any addition of separate hardware.

Figure 2:
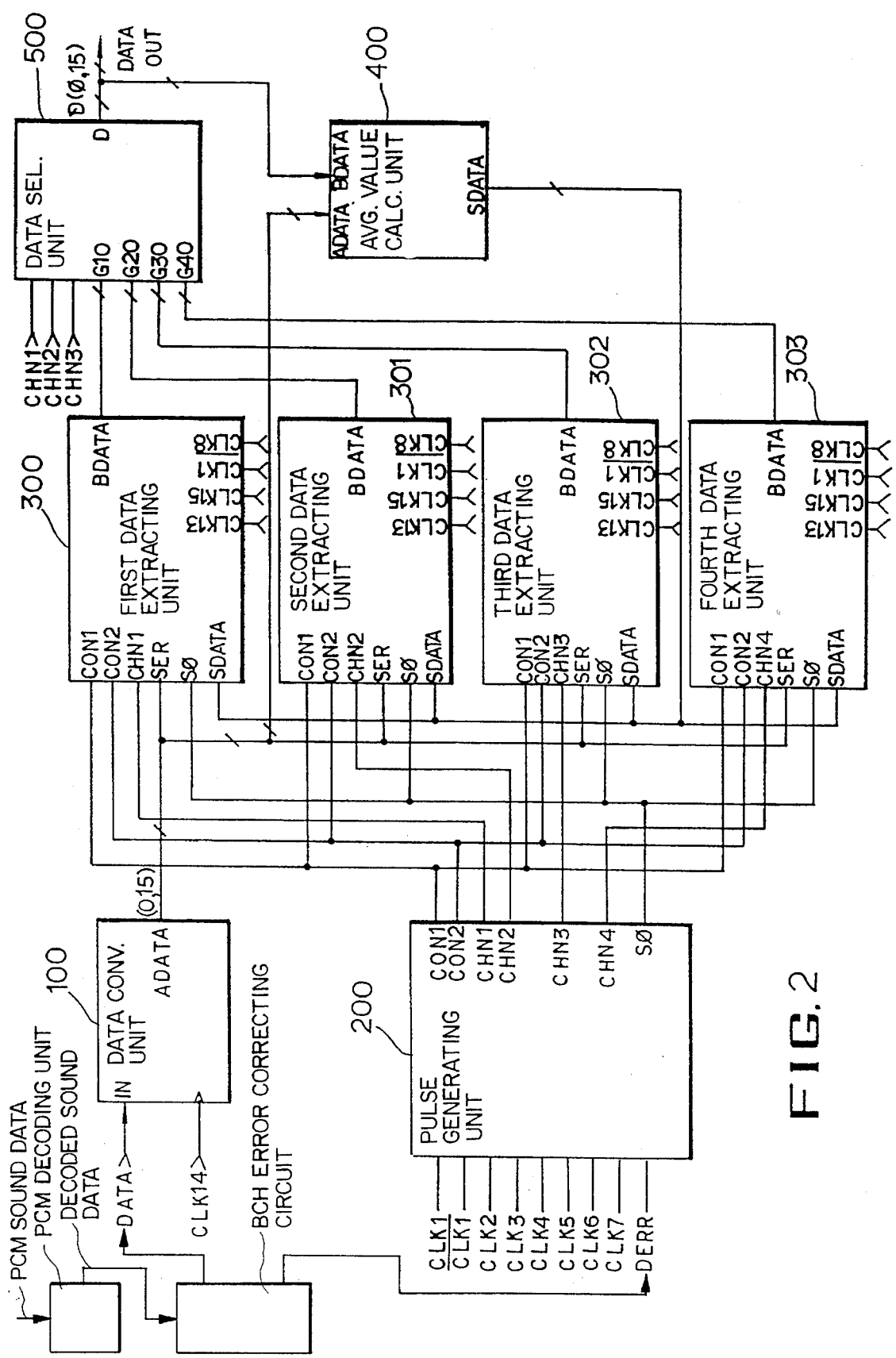
FIG. 2 is a block diagram of a sound data interpolating circuit in accordance with the present invention.

FIG. 2 is an overall block diagram of a sound data interpolating circuit in accordance with the present invention.

In FIG. 2 the data converting unit 100 converts sound data IN inputted in series into parallel sound data to thereby output the same.

Here, the sound data inputted into the data converting unit 100 are supplied from the BCH error correction circuit within a receiving system.

The BCH error correction circuit receives sound data decoded and outputted by a decoding unit for decoding PCM sound data to thereby perform error correction, and during a double error occurrence, outputs a double error signal DERR.

Conventionally, the sound data is 16-bit data and is outputted as parallel data by a clock CK14 generated from a separate clock generating means.

The pulse generating unit 200 performs a logical combination on the double error signal DERR outputted from the BCH error correction circuit and clock signals $\overline{CK1}$, CK1–CK7) outputted from the clock generating means to thereby generate interpolating pulses CON1 and CON2, channel gating pulses CHN1–CHN4 and a loading pulse SO.

The first, second, third and fourth data extracting units 300–303 have the same constructions, and in accordance with interpolating pulses CON1 and CON2 inputted from the pulse generating unit 200, channel gating pulses CHN1–CHN4, a loading pulse SO and clock signals (CK1, $\overline{CK8}$, CH13 and CK15) generated from the clock generating means, maintain the non-erroneous data prior to the error occurrence during a double error occurrence, or output interpolated data according to the non-erroneous data prior to and following the last erroneous sample data.

The data selecting unit 500 outputs data outputted from the first, second, third and fourth data extracting units 300–303 according to the sound channels.

The average value calculating unit 400 strikes an average value from the data outputted from the data converting unit 100 and data selecting unit 500 to thereby output the same to the first, second, third and fourth data extracting units 300–303.

As noted in the foregoing, the sound data interpolating circuit in accordance with the present invention performs an interpolating process to correct double errors which the BCH error correction circuit cannot correct.

Figure 3:
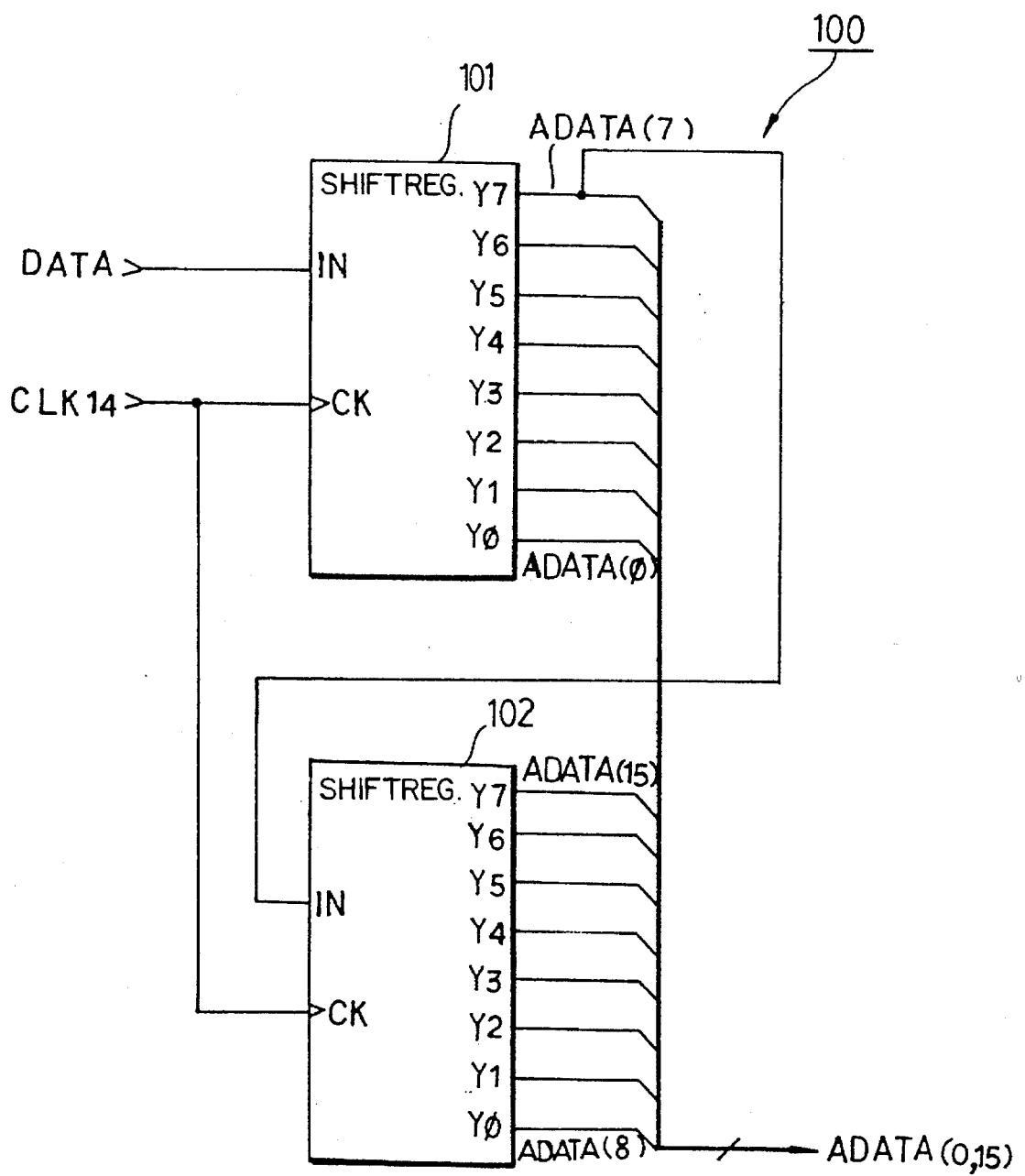
FIG. 3 is a detailed block diagram in accordance with an embodiment of a data converting unit illustrated in FIG. 2.

FIG. 3 is a detailed block diagram in accordance with an embodiment of the data converting unit 100 illustrated in FIG. 2.

In FIG. 2, when the sound data inputted in series to the data converting unit 100 does not include individual or continuous double error, because the double error signal DERR is not generated from the BCH error correction circuit, a signal of low level is inputted to the pulse generating unit 200 over all sample intervals.

Figure 4A:
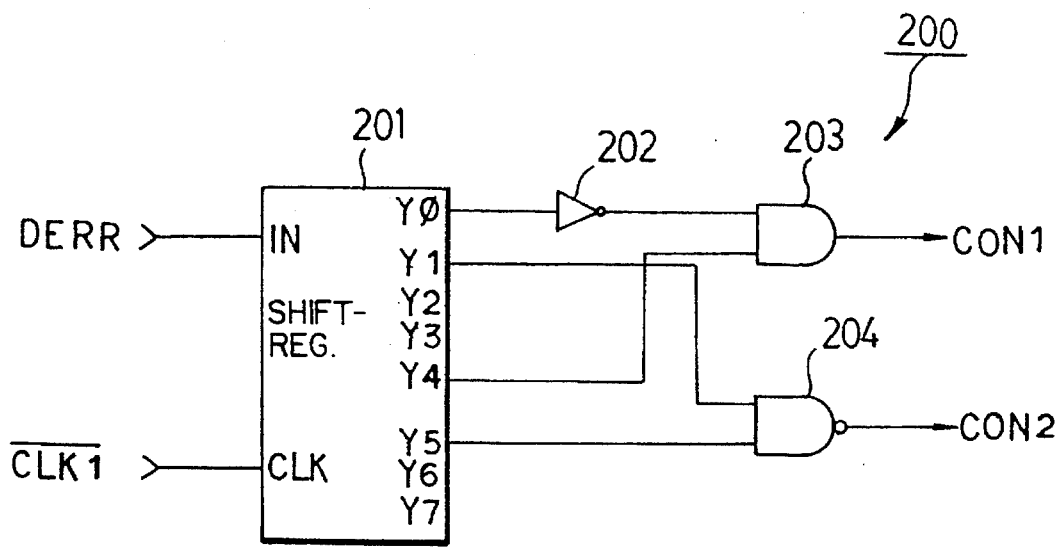
FIG. 4A, 4B and 4C are detailed block diagrams in accordance with an embodiment of a pulse generating unit illustrated in FIG. 2.
Figure 4B:
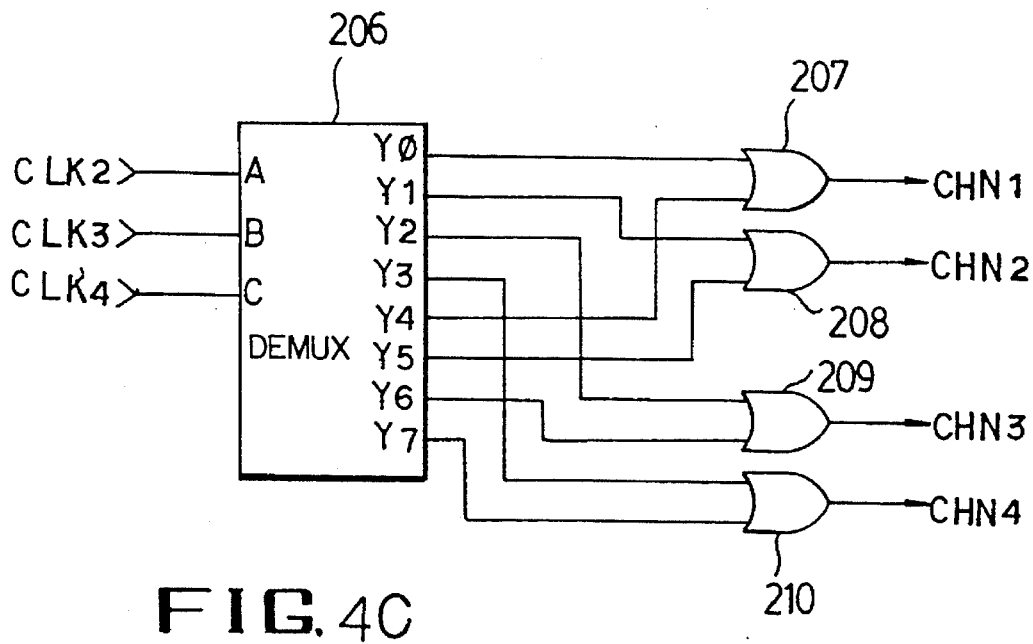
Figure 4C:
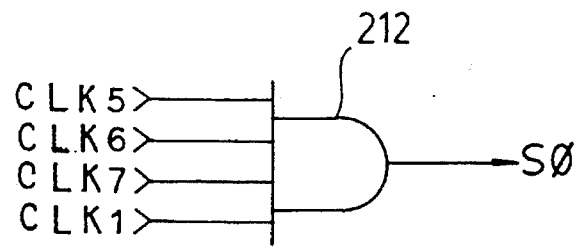
Figure 11:
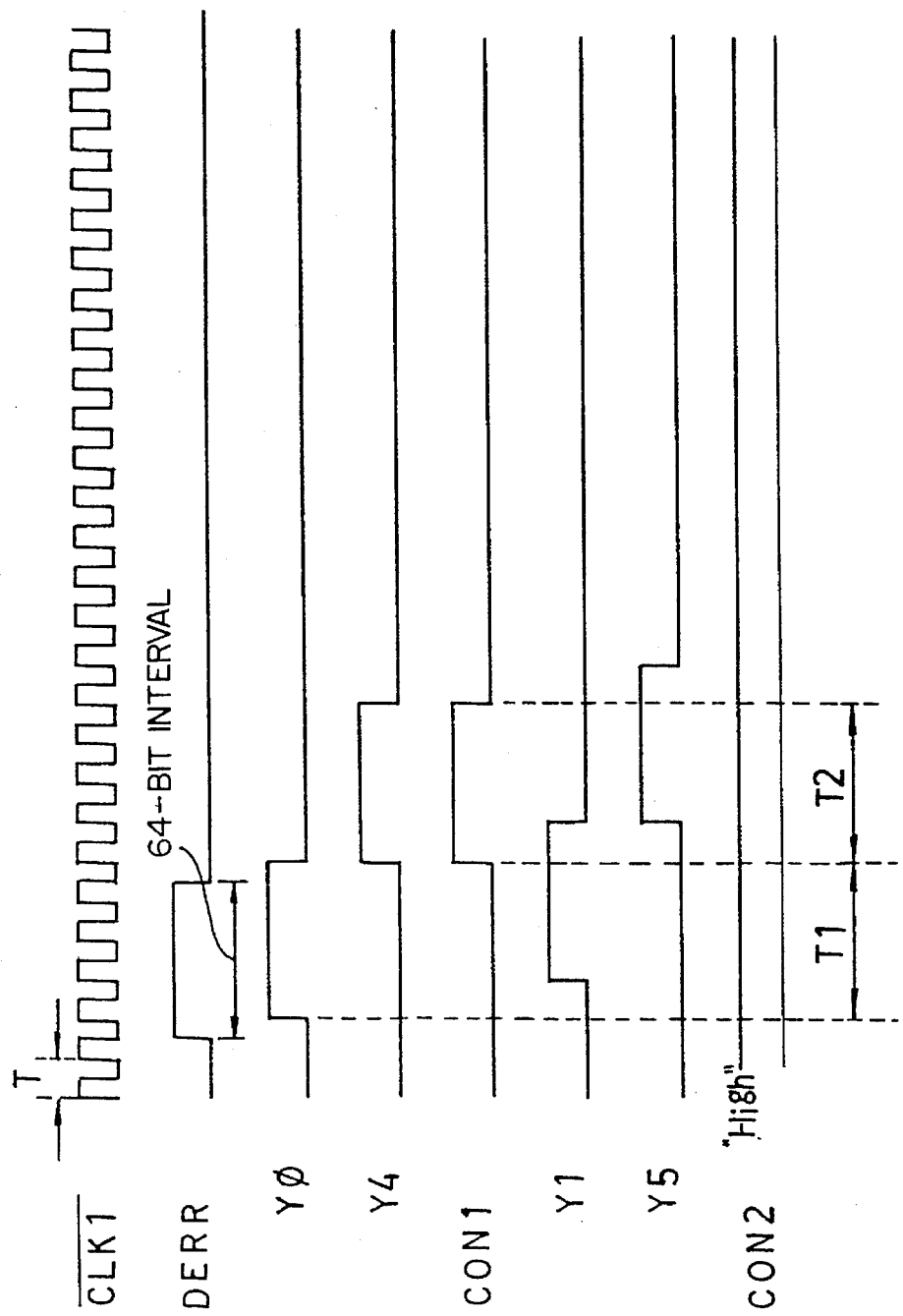
FIG. 11 is a timing diagram of FIG. 4A during individual double error occurrence.

Accordingly, a signal of low level is inputted to an input terminal IN of a shift register 201 of an interpolating pulse generating unit in the pulse generating unit 200 as illustrated in FIG. 4A, and is shifted by a clock ($\overline{CK1}$) as illustrated in FIG. 11 to thereby be outputted to output terminals Y0–Y7.

Therefore, the signal of low level is outputted to output terminals Y0–Y7 of the shift register 201 to thereby make the first interpolating pulse CON1 outputted by AND gate 203 be a signal of low level and make the second interpolating pulse CON2 outputted from NAND gate 204 be a signal of high level.

The first and second interpolating pulses CON 1 and CON 2 are, as shown in FIG. 2, respectively inputted to the first, second, third and fourth data extracting units 300–303.

Accordingly, a signal of low level is outputted from a first AND gate G2 of the data extracting units (300, or 301 or 302 or 303), and a signal of high level is outputted only in a 16-bit interval which is delayed by 16 bits more than a corresponding channel by D flip-flops D1 and D2 and an inverter G1 as illustrated in FIG. 13A, so that a clock CLK13 is outputted from a second AND gate G3.

In other words, as illustrated in FIG. 13A, a 16-bit clock CLK13 which is delayed by 16 bits from the corresponding channel is outputted from the second AND gate G3.

Figure 10:
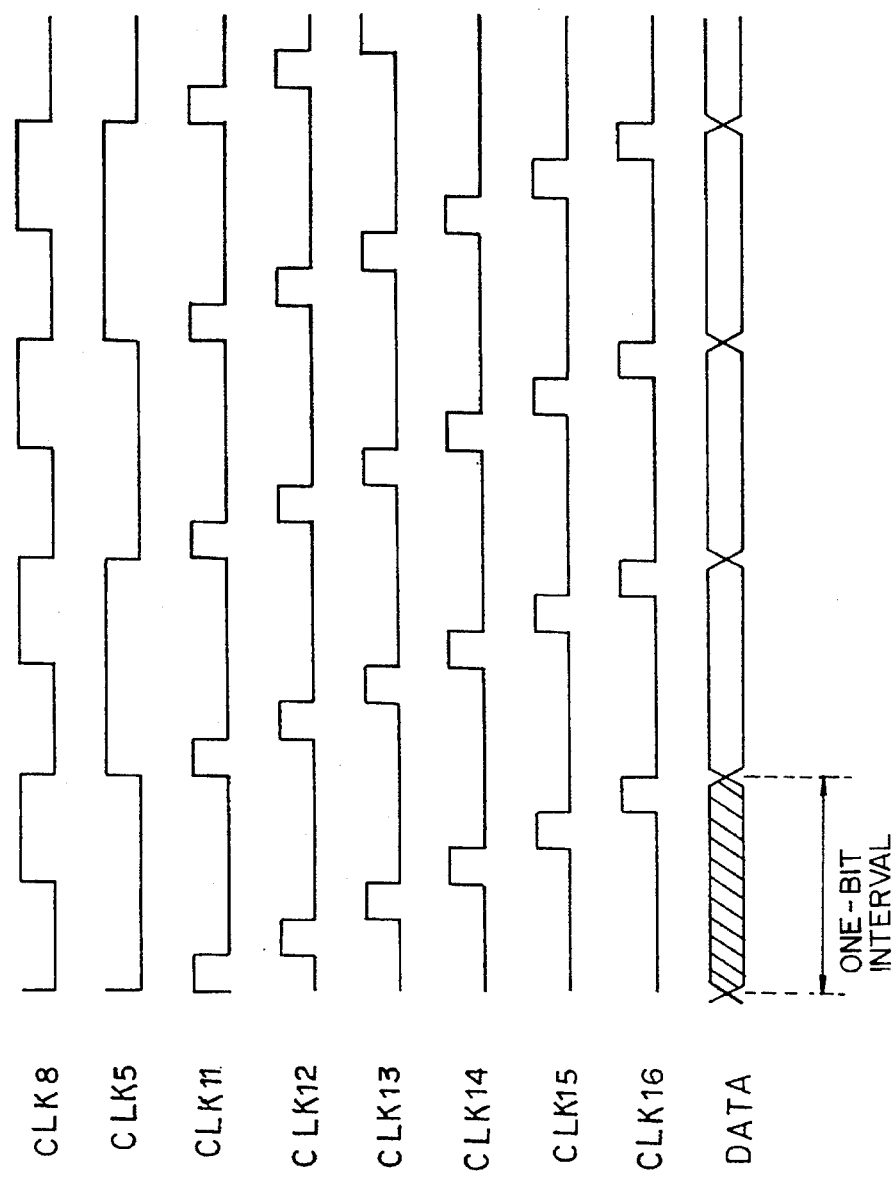
FIG. 10 is a timing diagram for FIG. 2 or FIG. 5.

The clock CLK13 is illustrated in FIG. 10.

Therefore, an output of an OR gate G4 becomes the same as the output of the second AND gate G3 to thereby be supplied to clocks of serial and parallel shift registers SPSR1 and SPSR2.

At this point, the clock ($\overline{CK8}$) inputted to the serial and parallel shift registers SPSR1 and SPSR2 becomes high level, as illustrated in FIG. 3A, to thereby be enabled.

Accordingly, the serial parallel shift registers SPSR1 and SPSR2 shift parallel data ADATA outputted from the data converting unit 100 in accordance with the clocks outputted from the OR gate G4 to thereafter output Y in series.

Furthermore, because the second interpolating pulse CON2 is a signal of high level, an output of the third AND gate G5 becomes the same as the second AND gate G3 to thereby be supplied to shift registers 310 and 320 as a clock.

The shift registers 310 and 320 shift serial data outputted from the serial parallel shift registers SPSR1 and SPSR2 in accordance with the clocks outputted from the third AND gate G5 to thereby output the same as parallel data BDATA.

Figure 7:
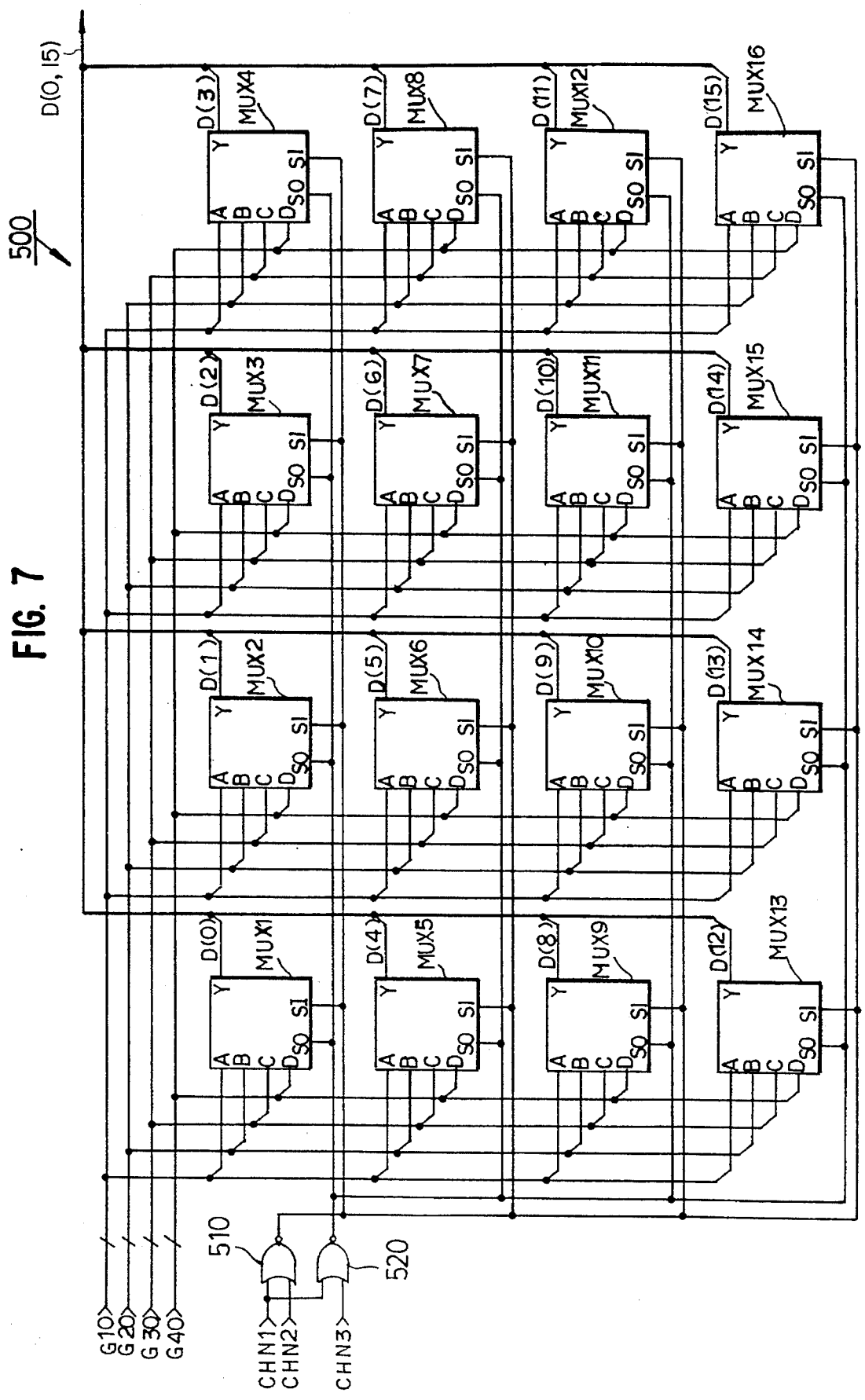
FIG. 7 is a detailed block diagram in accordance with an embodiment of a data selecting unit illustrated in FIG. 2.

As seen from the foregoing, the parallel sound data BDATA outputted from the respective shift registers 310 and 320 of the data extracting unit 300–303 in FIG. 2 are respectively inputted to the data selecting unit 500 at G10, G20, G30 and G40 (see FIG. 7).

The parallel sound data inputted to respective multiplexers MUX1–MUX16 as illustrated in FIG. 7 are selectively outputted to an output terminal D in response to first and second signals generated by first and second NOR gates 510 and 520.

When a double error signal is generated from the BCH error correction circuit as described above, it implies that one sample of the inputted sound data has no error, so it is apparent that the sound data interpolating circuit of the present invention outputs this inputted sound data as is.

In other words, if the sound data has no error, the inputted data is passed intact without average value interpolation and pre-interpolation being performed.

Hereinafter, an explanation will be given of how the sound data interpolating circuit of the present invention performs the average value interpolation and pre-interpolation on the individual or continuous double error sound data.

When an individual double error occurs, the double error signal DERR is outputted during a 64-bit interval in the BCH error correction circuit as illustrated in FIG. 11.

The double error signal DERR is inputted to the pulse generating unit 200 as illustrated in FIG. 2.

Figure 8:
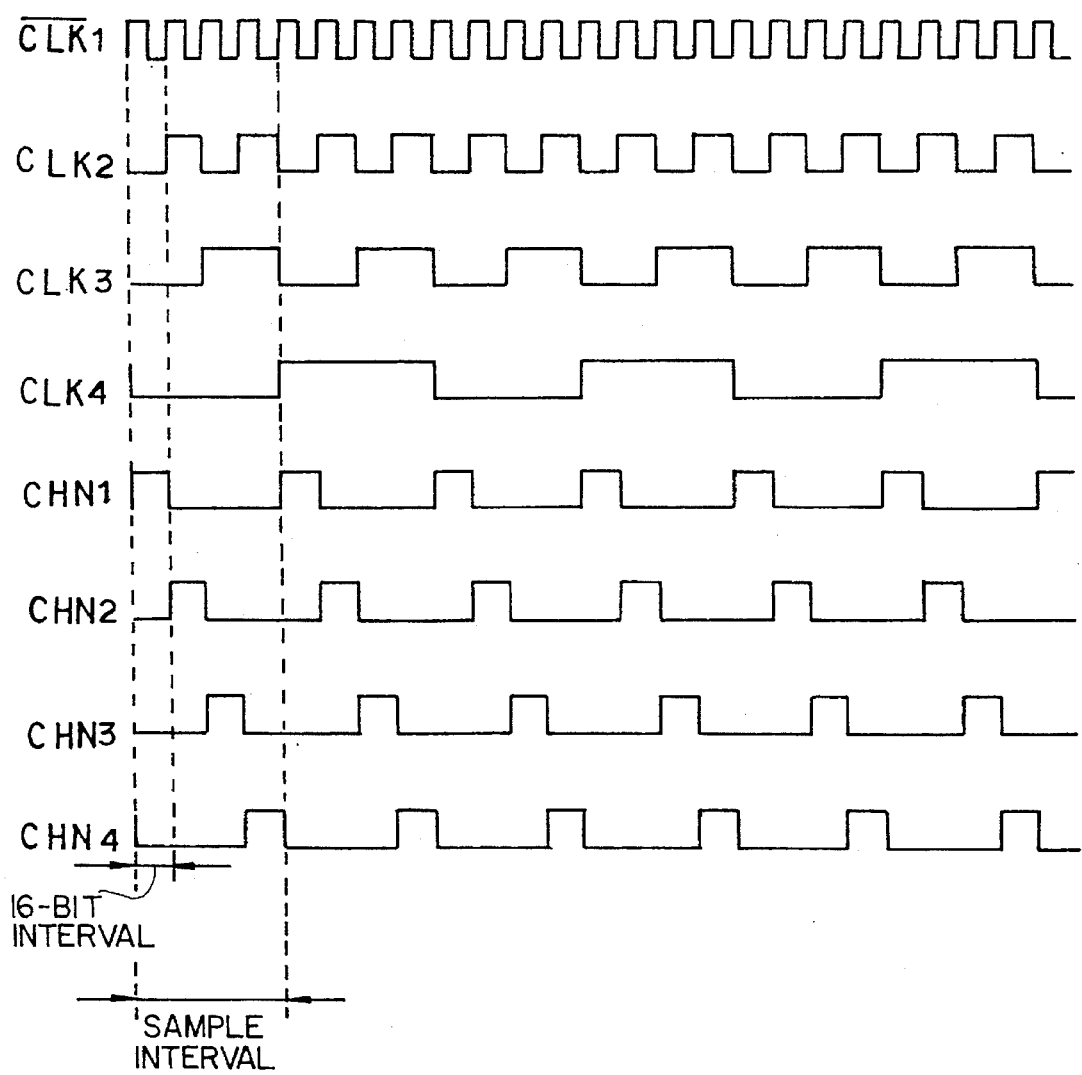
FIG. 8 is a timing diagram of a channel gating pulse generating unit illustrated in FIG. 4B.
Figure 9:
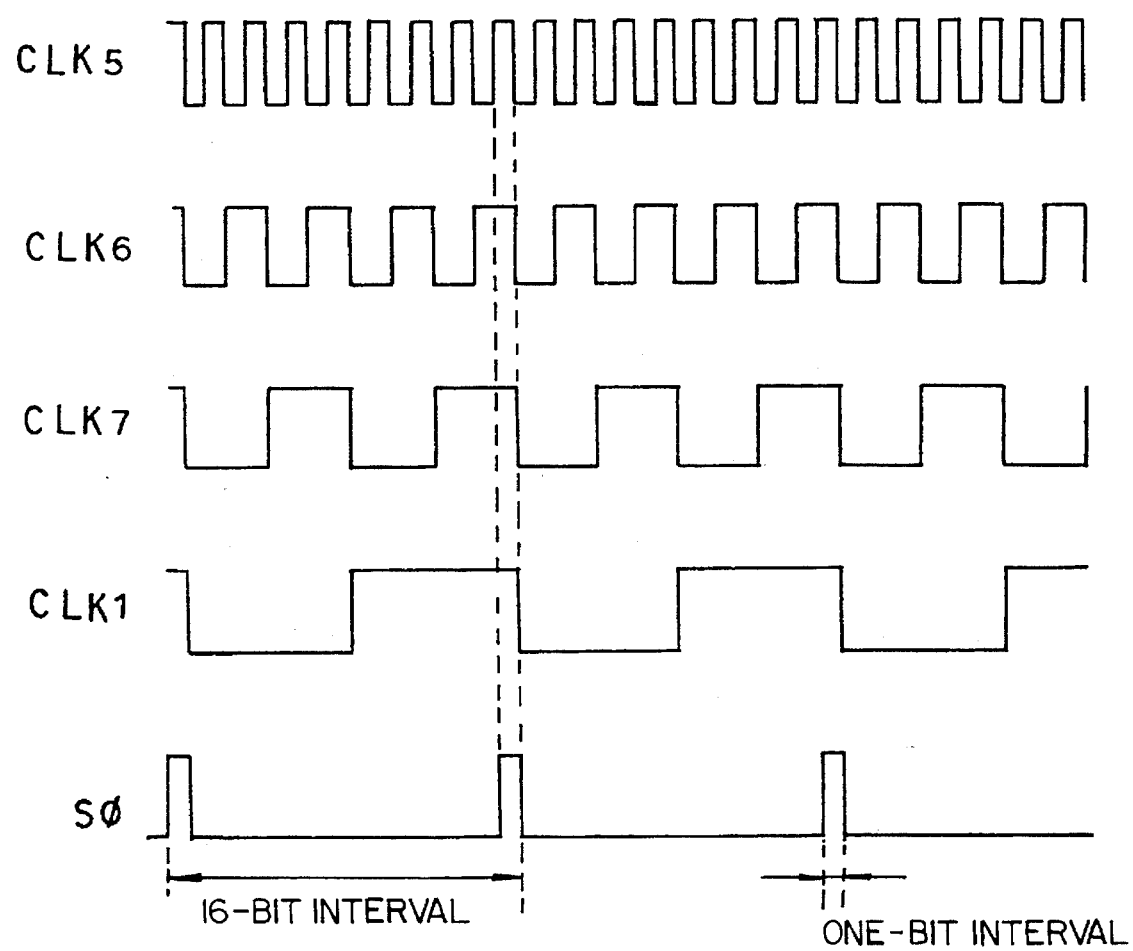
FIG. 9 is a timing diagram of a data loading pulse generating unit illustrated in FIG. 4C.

At the same time, clocks ($\overline{\text{CLK1}}$, CLK2, CLK3, CLK4, CLK5, CLK6 and CLK7) generated from the clock generating means are inputted to the pulse generating unit 200 as illustrated in FIGS. 8 and 9.

An interpolating pulse generating unit of the pulse generating unit 200 generates the first interpolating pulse CON1 as illustrated in FIG. 11 in response to an AND gate 203 which performs a logical multiply on an inverted signal of a first output Y0 of the shift register 201 and an inverted signal of a fifth output Y4.

Furthermore, the second interpolating pulse CON2 as illustrated in FIG. 11 is generated by an AND gate 204 which performs a NAND operation on a second output Y1 and sixth output Y5 of the shift register 201 of the pulse generating unit 200.

In FIG. 11, interval T represents a 16-bit period; 64-bits is one sample of the sound data.

Interval T1 represents the read time of the sound data and interval T2 represents an average value interpolating interval for an individual double error.

The average value interpolating interval is a 64-bit interval corresponding to the sound data of one sample.

The channel gating pulse generating unit of the pulse generating unit 200 produces channel gating pulses CHN1, CHN2, CHN3 and CHN4 in accordance with waveforms CLK2, CLK3 and CLK4 as illustrated in FIG. 8. In other words, demultiplexer 206 sequentially outputs Y0–Y7 pulses of high level in accordance with the waveforms CLK2, CLK3 and CLK4.

First, second, third and fourth OR gates 207–210 which receive the outputs Y0–Y7, when the respective output pulses, Y0 or Y4, Y1 or Y5, Y2 or Y6, Y3 or Y7 are at the high levels, generate the first, second, third and fourth channel gating pulses CHN1, CHN2, CHN3 and CHN4 as illustrated in FIG. 8.

A loading pulse generating unit of the pulse generating unit 200 performs a logical multiply on the waveforms CLK5, CLK6, CLK7, CLK1 as illustrated in FIG. 9 to thereby generate 16-bit data loading pulses SO.

In other words, the loading pulse generating unit comprised of an AND gate 212 generates loading pulses SO of high level when one of the waveforms CLK5, CLK6, CLK7 and CLK1 is at high level.

The first and second interpolating pulses CON1 and CON2, the channel gating pulses CHN1, CHN2, CHN3 and CHN4, and loading pulse SO outputted from the pulse generating unit 200 are respectively inputted into the first, second, third and fourth data extracting units 300, 301, 302 and 303.

The reason there are 4 channel gating pulses CHN1, CHN2, CHN3 and CHN4 as illustrated in FIG. 8 is that there exist 4 channels within one sound sample in the PCM transmitting method for a conventional television satellite broadcasting system. Accordingly, it is natural that the channel gating pulses should be changed according to the channels.

As mentioned above, in the case of 4 channels, the size of the sound data corresponding to one channel within one sample becomes 16 bits.

Therefore, the data converting unit 100 as illustrated in FIG. 2 receives 16-bit serial sound data.

The data converting unit 100, as illustrated in FIG. 3, comprises two 8-bit shift registers 101 and 102 corresponding to a 16-bit shift register.

The data converting unit 100 converts the inputted serial sound data to 16-bit parallel sound data ADATA in response to a clock CLK14 as illustrated in FIG. 10 to thereby output the same.

The 16-bit parallel sound data ADATA outputted from the data converting unit 100 is inputted in parallel to the average value calculating unit 400 and at the same time, is inputted to respective input terminals SER of the first, second, third and fourth data extracting units 300–303.

At this moment, the 16-bit parallel sound data ADATA is inputted to a parallel port of the average value calculating unit 400 and inputted to a serial port of the first, second, third and fourth data extracting units 300, 301, 302 and 303.

In other words, the respective serial ports of the data extracting units 300, 301, 302 and 303 are connected to only one port ADATA to which an uppermost bit of the 16-bit parallel sound data ADATA outputted from the data converting unit 100 is outputted, so that the 16-bit parallel sound data is shifted to thereby be inputted in series.

Figure 5:
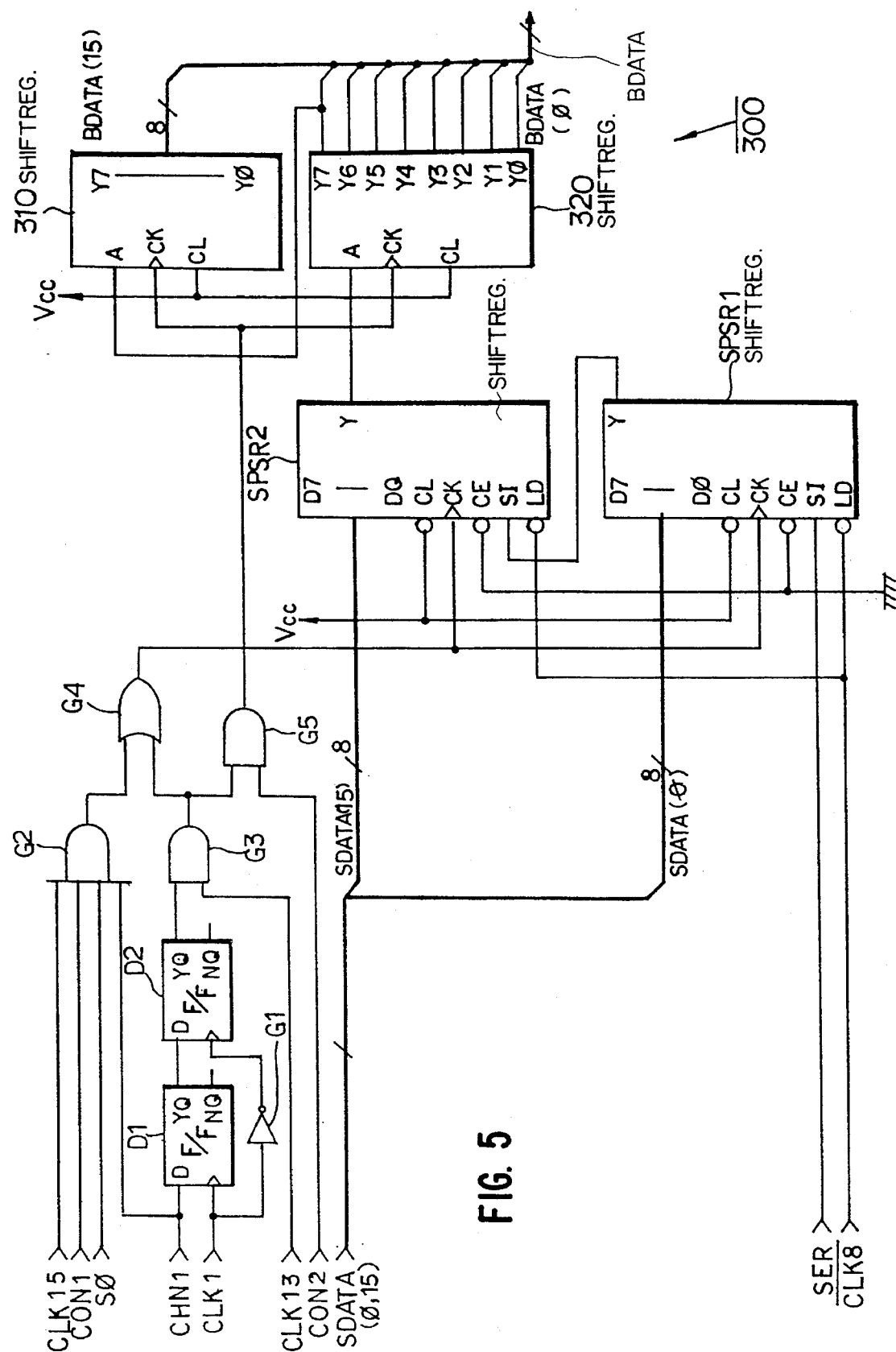
FIG. 5 is a detailed block diagram in accordance with an embodiment of a data extracting unit illustrated in FIG. 2.

The data extracting units 300, 301, 302 and 303 have respective constructions as illustrated in FIG. 5 and for convenience only the first data extracting unit 300 will be explained.

In FIG. 5, a clock CLK15 is inputted to one input terminal of the first AND gate G2 as illustrated in FIG. 10. A clock CLK13 is inputted to one input terminal of the second AND gate G3 as illustrated in FIG. 10.

A clock ($\overline{\text{CLK8}}$) as illustrated in FIG. 13B (which is inverted clock CLK8 illustrated in FIG. 10) is inputted to load terminals LD of the shift registers SPSR1 and SPSR2.

The data inputted to parallel input terminals SDATA of the shift registers SPSR1 and SPSR2 is 16-bit parallel data fed back from the average value calculating unit 400 and 16-bit parallel data which is prior by one sample to the currently-inputted channel data.

The first and second interpolating control signals, the first channel gating signal and loading signal are inputted to respective input terminals of the signal generating unit 200.

Accordingly, waveforms outputted from an OR gate G4 become the same as the shapes G4 illustrated in FIG. 13B.

If the above waveforms are compared with the waveforms G4 of FIG. 13A which are the first clock pulses in the normal state where a double error has not occurred, it can be noted that loading clocks LK have been added to the shifting clocks for shifting the 16-bit data.

When the clock ($\overline{\text{CLK8}}$) inputted to the load terminals LD of the shift registers SPSR1 and SPSR2 is low as illustrated in FIG. 13B, the shift registers SPSR1 and SPSR2 load 16-bit parallel data SDATA outputted from the average value calculating unit 400 in accordance with the loading pulses outputted from the OR gate G4.

Henceforth, when the clock ($\overline{\text{CLKS}}$) inputted into the load terminals LD is at high level, shifted data are outputted to an output terminal Y of the shift register SPSR2 in the order SDATA15, SDATA14, SDATA 13, . . . , SDATA0 in response to a 16-bit shift clock outputted from the OR gate G4, and then inputted to the shift registers SPSR1 and

SPSR2.

When the 16-bit data inputted from the average value calculating unit 400 are sequentially outputted, data of the next channel is outputted by repeated performance of the aforementioned operations.

In the foregoing description, explanation was given only for one channel for convenience, however the interpolating operation is performed on the whole sample.

In other words, as depicted in FIG. 11, the high level interval for the first interpolating pulse CON1 is a 64-bit interval, however, for convenience, explanation was given on a 16-bit interval only. Accordingly, the loading clock LK and shifting clock described in FIG. 13B are generated repeatedly for as many channels as are present.

As seen from the foregoing, when the 16-bit data of the last channel out of the data inputted from the average value calculating unit 400 is outputted, data outputted from the data converting unit 100 is sequentially inputted to an input terminal SI of the shift register SPSR1.

The data outputted from the data converting unit 100 and inputted to the input terminal SI of the shift register SPSR1 is also shifted to thereby be outputted.

As seen from the foregoing, the respective data extracting units 300, 301, 302 and 303 selectively output bits (16-bits) corresponding to one channel of the (64-bit) sample in accordance with channel gating pulses CHN1, CHN2, CHN3 and CHN4 outputted from the pulse generating unit 200.

Here, as depicted in FIG. 11 the reason the first interpolating pulse CON1 is made to be interpolated within the interval T2 of high level is because a data read time of interval T1 is needed.

Serial 16-bit data outputted at Y from the shift register SPSR2 is inputted at A to a shift register 320.

The shift register 320 converts the data inputted serially, in response to the clock outputted from a third AND gate G5, to parallel data to thereby output the same.

The uppermost bit outputted from the shift register 320 is inputted at A to another shift register 310.

The shift register 310 inputs in series data outputted from the shift register 320 in response to a clock outputted from the third AND gate G5 and converts it to parallel data to thereby output the same.

Here, the shift registers 310 and 320 have 8-bit output ports, which correspond to a 16-bit shift register.

Accordingly, 16-bit parallel sound data per respective channel are respectively inputted to parallel input terminals G10, G20, G30 and G40 of a data selecting unit 500 in response to the sound channels.

The detailed construction of the data selecting unit 500, as illustrated in FIG. 7, comprises input multiplexers MUX1–MUX16.

Outputs of NOR gates NOR1 and NOR2 for inputting channel gating pulses (CHN1, CHN2) and (CHN1, CHN3) are inputted to respective selection terminals S0 and S1 of the multiplexers MUX1–MUX16.

As seen from above, it is apparent that the data selecting unit 500 exhibits automatic selection as to 4 channels without the assistance of the fourth channel gating pulse CHN4.

The data selecting unit 500 outputs the inputted 16-bit parallel data to an output terminal D in the input order of the channel data. Meanwhile, the data outputted from the data selecting unit 500 is inputted to the average value calculating unit 400.

The average value calculating unit 400 strikes an average value of the data BDATA inputted from the selecting unit 500 and the data ADATA inputted from the data converting unit 100 to thereby output the same.

In other words, in the case of an individual double error, average value interpolation is performed per the principle illustrated in FIG. 1A.

In FIG. 1A, in the case of an individual double error, the data prior to and following the individual double error are combined, then divided by 2, and the data thus obtained is outputted.

Figure 6:
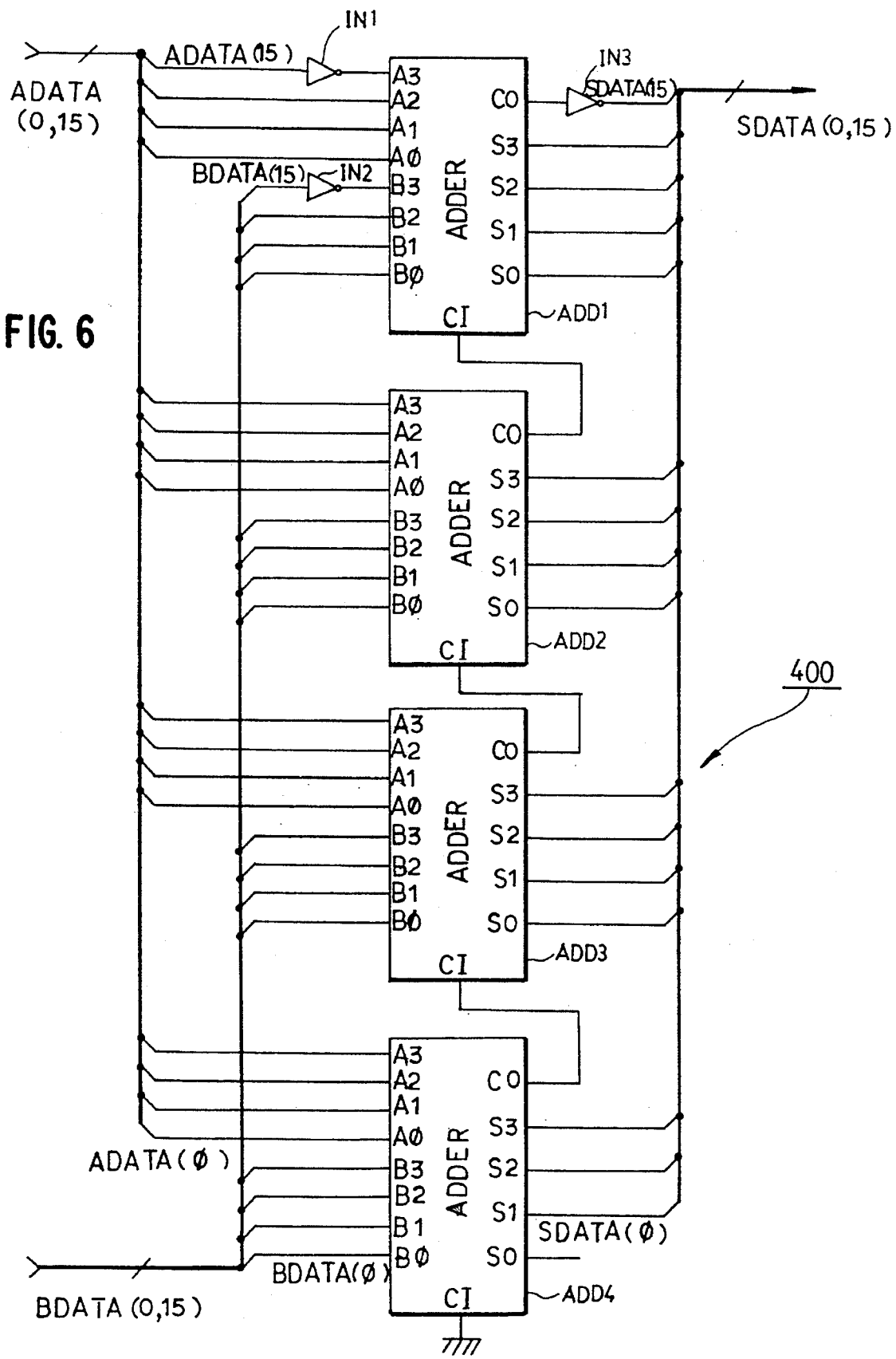
FIG. 6 is a detailed block diagram in accordance with an embodiment of an average value calculating unit illustrated in FIG. 2.

In the average value calculating unit 400 as illustrated in FIG. 6, the uppermost bits (at the input terminals A3 and B3) of adder ADD1 are inverted by inverters IN1 and IN2 to thereby be added, and the balance of the bit inputs are corresponded to one another to thereby be added.

An output at output terminal CO representing the uppermost bit of the adder ADD1 is inverted by an inverter IN3, so that an average value of the two inputs is obtained at the output terminal SDATA.

The operation of the average value calculating unit 400, as explained in the foregoing, is processed in channel order per 16 bits outputted from the data selecting unit 500, and the processed outputs are supplied to the input terminals SDATA of the data extracting units 300, 301, 302 and 303.

Accordingly, the shift registers SPSR1 and SPSR2, as illustrated in FIG. 5, load the average value-interpolated 16-bit parallel data when the clock ($\overline{CLK8}$) inputted into the load terminal LD is low and loading pulse LK among the waveforms G4 illustrated in FIG. 13B is inputted.

Then, the data loaded into the shift registers SPSR1 and SPSR2 are shifted in response to the 16-bit shift clock to thereby be outputted in series.

The shift registers 310 and 320 convert the data outputted from the shift registers SPSR1 and SPSR2 to parallel data to thereby output the same as BDATA.

Accordingly, the data selecting unit 500 responds to the channel gating pulses CHN1, CHN2 and CHN3 to thereby output in parallel the average value-interpolated 64-bit data, in units of 16 bits.

The average value-interpolated and outputted parallel sound data are generally converted again to analog form to thereafter be aurally outputted through a speaker or the like, and the output has improved tone quality compared with the double error-ridden sound data outputted as is.

An explanation of the pre-interpolation performed during a continuous double error occurrence will now be described.

Figure 12:
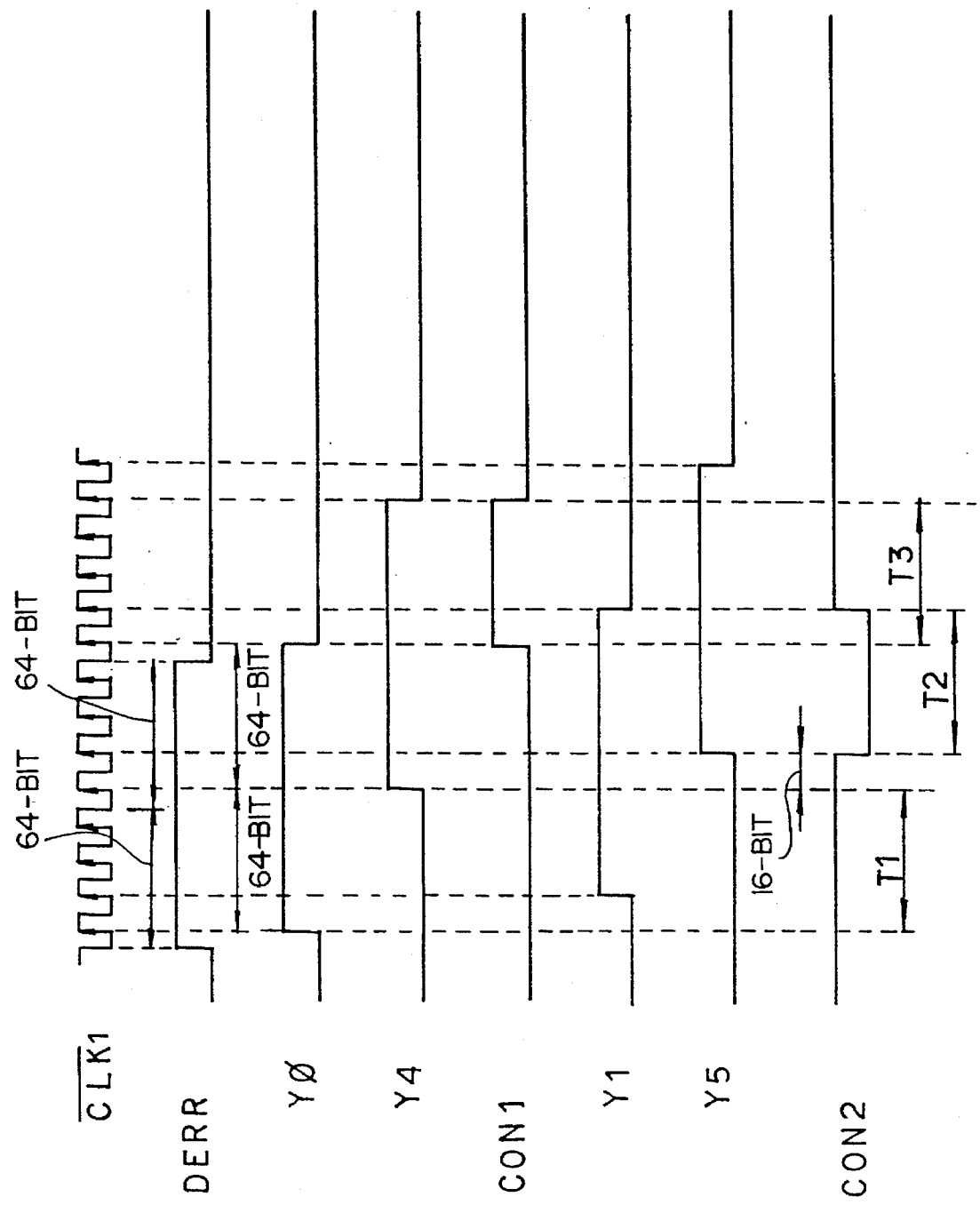
FIG. 12 is a timing diagram of FIG. 4A during a continuous double error occurrence.

In the case of the continuous double error occurrence, the double error signal DERR outputted from the BCH error correction circuit is maintained at high level during (at least) a 128-bit interval (64-bits X 2), as illustrated in FIG. 12.

Therefore, the first interpolating pulse CON1 maintains the high level state from the point where the double error signal DERR transits from high to low, to a point 64-bits later.

Furthermore, the second interpolating pulse CON2 maintains a low level for a pre-maintenance interval T2, and then maintains a high level for the balance of the time.

In FIG. 12, the interval T1 represents a data read time and T3 represents an interpolating time.

Figure 13C:
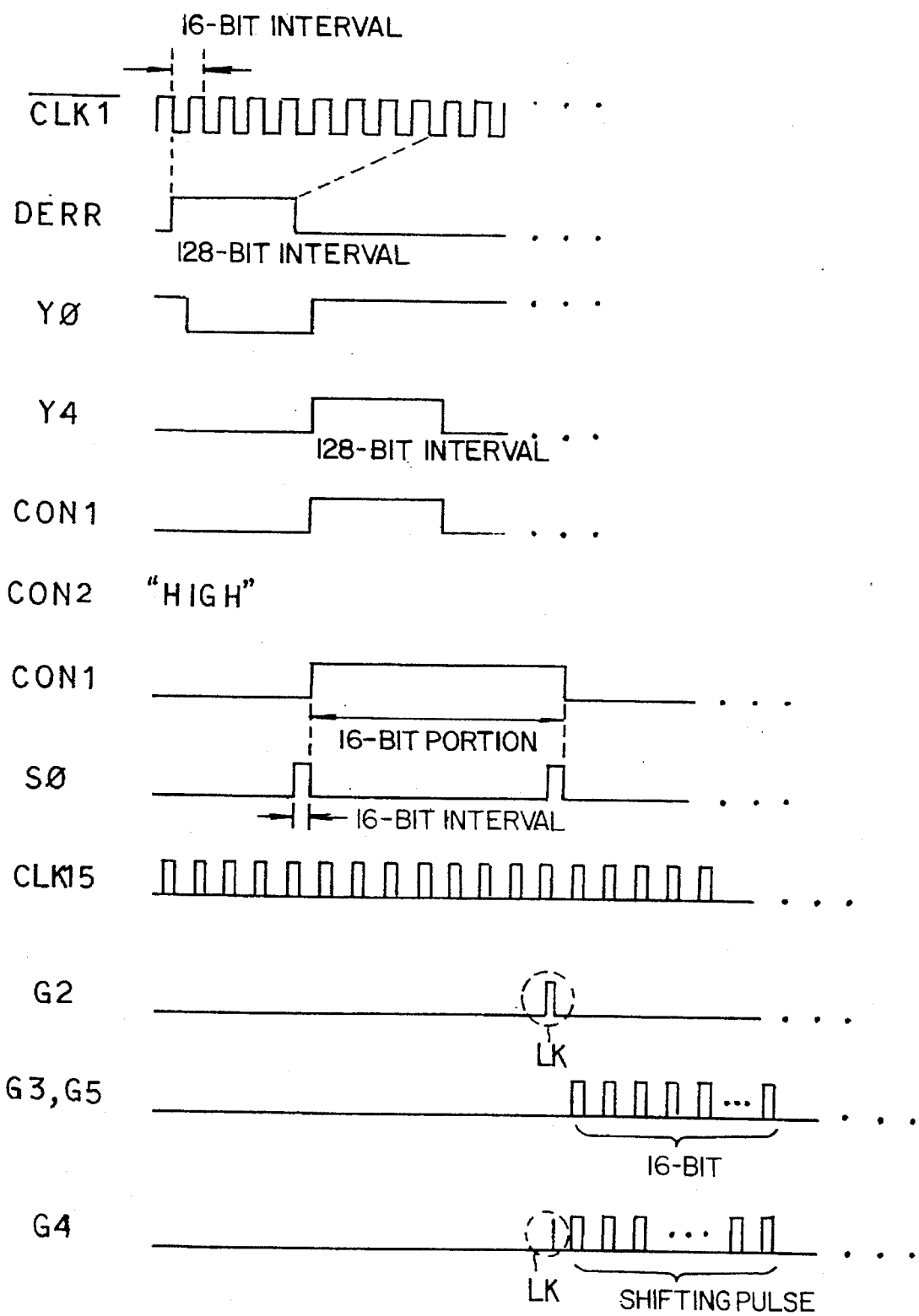
FIG. 13C is a timing diagram of FIG. 5 during a continuous double error occurrence.

Accordingly, as illustrated in FIG. 5, operational waveforms of the data extracting unit 300 are represented as in FIG. 13C.

In other words, it will be noted that the first AND gate G2 does not make the loading clock LK rise until the first 128-bit interval after the double error signal DERR becomes high, whereas the gate makes the loading clock for the balance 128-bit interval.

It can be noted that, in the 128-bit interval where a continuous double error has occurred, the loading clock is pulsed every 16-bit interval, bringing the number of the clock pulses to 8 over 128 bits.

In FIG. 13C, however, for convenience, an interval corresponding to 16 bits is illustrated.

The pulses outputted from the third AND gate G5 during the pre-maintenance interval T2 of the second interpolating pulse CON2 as illustrated in FIG. 12 maintain the previously-inputted sample data, and the average value interpolating operations are, as mentioned before, performed in the average value calculating unit 400 during the next sample period.

The reason a difference of 16 bits occurs between the interval T1 and the interval T2 in FIG. 12 is because there exists a difference of 16 bits between the data generated by the shift registers (SPSR1, SPSR2) and the shift registers (310, 320) of FIG. 5

As seen from the foregoing, the present invention improves tone quality by processing by interpolation the sound data where individual and continuous double errors uncorrectable at the error correction circuit have occurred.

Although the invention has been described in detail with reference to its presently preferred embodiments, it will be understood by one of ordinary skill in the art that various modifications can be made, without departing from the spirit and scope of the invention. Accordingly, it is not intended that the invention be limited, except as by the appended claims.

What is claimed is:

1. A sound data interpolating circuit, comprising:

data converting means for converting inputted serial sound data to parallel sound data and for outputting the parallel sound data;

pulse generating means for generating interpolating pulses, channel gating pulses and loading pulses according to a double error signal outputted from a Bose-Chaudhuri-Hocquenghem (BCH) error correction circuit and a clock signal generated by clock generating means, said pulse generating means comprising:
 a) an interpolating pulse generating unit for generating interpolating pulses form the double error signal outputted from the BCH error correction circuit;
 b) a channel gating pulse generating unit for generating channel gating pulses in accordance with the sound data channel;
 c) a loading pulse generating unit for loading pulses in order to output 16-bit data interpolated during an occurrence of double error;
 d) a shift register for shifting the double error signal inputted from the BCH error correction circuit in response to the clock signal generated from the clock generating means;
 e) an AND gate for generating a first interpolating pulse by performing a logical multiply operation on a first signal outputted from a first output terminal of the shift register and then inverted by an inverter and a second signal outputted from a fourth output terminal of the shift register; and
 f) a NAND gate for performing a logical multiply operation on third and fourth signals outputted from a second and a fifth output terminal, respectively, and inverting a result of the logical multiply operation to generate a second interpolating pulse;

data extracting means for maintaining a prior data during a double error occurrence or outputting a data interpolated using prior and following data in accordance with the interpolating pulses inputted from the pulse generating means, the channel gating pulses, the loading pulses and clock signals generated from the clock generating means, so that for a continuing double error the prior data is maintained except for a last occurrence of the double error when the interpolated data is output;

data selecting means for outputting data outputted from the data extracting means according to a sound channel; and average value calculating means for calculating an average value of data outputted from the data converting means and data selecting means to thereafter output the average value.

2. A sound data interpolating circuit as defined in claim 1, wherein the clock signal generated from the clock generating means has a pulse width corresponding to 16-bits of the serial sound data.

3. A sound data interpolating circuit as defined in claim 1, wherein the channel gating pulse generating unit comprises demultiplexers for generating pulses in response to a clock outputted from the clock generating means; and a logic gate for outputting channel gating pulses by performing a logical sum on pulses outputted from the demultiplexers.

4. A sound data interpolating circuit as defined in claim 3, wherein the clock signal outputted from the clock generating means has pulse widths corresponding to 32-bits, 64-bits and 128-bits of the serial sound data.

5. A sound data interpolating circuit as defined in claim 3, wherein a number of channel gating pulses is equal to a number of channels with a pulse width corresponding to an interval where one sample interval is divided by the number of channels.

6. A sound data interpolating circuit as defined in claim 1, wherein the loading pulse generating unit comprises AND gates for performing a logical multiply operation on the clock signal generated from the clock generating means.

7. A sound data interpolating circuit as defined in claim 6, wherein the clock generated by the clock generating means has clock numbers corresponding to where bit numbers of one channel are divided by 2, 4, 8 and 16.

8. A sound data interpolating circuit comprising:

data converting means for converting inputted serial sound data to parallel sound data and for outputting the parallel sound data;

pulse generating means for generating interpolating pulses, channel gating pulses and loading pulses according to a double error signal outputted from a Bose-Chaudhuri-Hocquenghem (BCH) error correction circuit and a clock signal generated by clock generating means;

data extracting means for maintaining a prior data during a double error occurrence or outputting a data interpolated using prior and following data in accordance with the interpolating pulses inputted from the pulse generating means, the channel gating pulses, the loading pulses and clock signals generated from the clock generating means, so that for a continuing double error the prior data is maintained except for a last occurrence of the double error when the interpolated data is output, said data extracting means comprising:
a) a clock control unit for generating a data shifting clock encompassing loading pulses in response to the double error occurrence; and
b) a data selecting unit for selectively outputting data shifting clocks including loading pulses generated from the clock control unit and data interpolated or inputted by a second clock, different form said data shifting clock, having a pulse width corresponding to one bit, and data selected form the data selecting unit, wherein the selectively output data is in parallel;

data selecting means for outputting data outputted from the data extracting means according to a sound channel; and average value calculating means for calculating an average value of data outputted from the data converting means and data selecting means to thereafter output the average value;

wherein the clock control unit comprises:
a) a first AND gate for performing a logical multiply operation on a third clock for generating one pulse per data bit, a first interpolating pulse generated from the interpolating pulse generating unit, a fourth clock for generating one pulse per channel and the first channel gating pulse;
b) a demultiplexer for delaying by a period corresponding to one channel the first channel gating pulse in response to a fifth clock having a pulse width corresponding to a 16-bit interval of the serial sound data;
c) a second AND gate for performing a logical multiply operation on the first channel gating pulse delayed by the demultiplexer and a sixth clock for generating one pulse per data unit;
d) an OR gate for performing a logical multiply operation on outputs of the first and second AND gates to thereby generate the data shifting clocks including loading pulses; and
e) a third AND gate for performing a logical multiply operation on an output of the second AND gate and a second interpolating signal to thereby generate a seventh clock for shifting data corresponding to one channel.

\* \* \* \* \*